(12) United States Patent
Haskins et al.

(10) Patent No.: US 9,799,932 B2
(45) Date of Patent: Oct. 24, 2017

(54) BATTERY THERMAL MANAGEMENT SYSTEM FOR ELECTRIFIED VEHICLE

(71) Applicant: FORD GLOBAL TECHNOLOGIES, LLC, Dearborn, MI (US)

(72) Inventors: Harold J. Haskins, Corvallis, OR (US); Theodore James Miller, Milan, MI (US); Xiao Guang Yang, Northville, MI (US); Patrick Daniel Maguire, Ann Arbor, MI (US); OuJung Kwon, Novi, MI (US); James Matthew Marcicki, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/362,845

(22) Filed: Nov. 29, 2016

(65) Prior Publication Data

US 2017/0125859 A1   May 4, 2017

Related U.S. Application Data

(63) Continuation of application No. 14/155,657, filed on Jan. 15, 2014, now Pat. No. 9,515,357.

(51) Int. Cl.
| | |
|---|---|
| *H01M 10/617* | (2014.01) |
| *H01M 10/625* | (2014.01) |
| *H01M 10/637* | (2014.01) |
| *H01M 10/6556* | (2014.01) |
| *H01M 10/6568* | (2014.01) |
| *H01M 10/48* | (2006.01) |
| *H01M 10/63* | (2014.01) |

(Continued)

(52) U.S. Cl.
CPC ....... *H01M 10/617* (2015.04); *H01M 10/486* (2013.01); *H01M 10/625* (2015.04); *H01M 10/63* (2015.04); *H01M 10/637* (2015.04); *H01M 10/653* (2015.04); *H01M 10/6555* (2015.04); *H01M 10/6556* (2015.04); *H01M 10/6568* (2015.04); *H01M 2220/20* (2013.01)

(58) Field of Classification Search
CPC ........... H01M 2220/20; H01M 10/486; H01M 10/617; H01M 10/625; H01M 10/63; H01M 10/653; H01M 10/6555; H01M 10/6568

See application file for complete search history.

(56) References Cited

U.S. PATENT DOCUMENTS

| | | |
|---|---|---|
| 5,569,552 A | 10/1996 | Rao et al. |
| 5,585,204 A | 12/1996 | Oshida et al. |
| 6,479,185 B1 | 11/2002 | Hilderbrand et al. |

(Continued)

OTHER PUBLICATIONS

J. Taylor, et al., "Flexible Graphite Thermal Management Solutions for Lithium Ion Battery Packs," NAATBalt Workshop Apr. 3, 2012, pp. 1-16.

(Continued)

*Primary Examiner* — Brittany Raymond
(74) *Attorney, Agent, or Firm* — Carlson, Gaskey & Olds (57) ABSTRACT

A battery system includes a first battery module, a second battery module, a supply line, a return line, and a film heater. The supply and return lines are configured to circulate a heat transfer medium in response to a first temperature condition, and the film heat is configured to heat the first battery module and the second battery module in response to a second temperature condition.

16 Claims, 5 Drawing Sheets

(51) Int. Cl.
      *H01M 10/653*     (2014.01)
      *H01M 10/6555*    (2014.01)

(56)           References Cited

U.S. PATENT DOCUMENTS

| | | |
|---|---|---|
| 7,501,793 B2 | 3/2009 | Kadouchi et al. |
| 8,117,857 B2 | 2/2012 | Kelty et al. |
| 8,404,375 B2 | 3/2013 | Gaben |
| 8,409,743 B2 | 4/2013 | Okada et al. |
| 2005/0129991 A1 | 6/2005 | Breault |
| 2006/0088746 A1 | 4/2006 | Tuma et al. |
| 2011/0027625 A1 | 2/2011 | Payne |
| 2011/0300421 A1* | 12/2011 | Iritani ................. H01M 10/625 429/72 |
| 2012/0021260 A1 | 1/2012 | Yasui et al. |
| 2012/0183823 A1* | 7/2012 | Von Borck .......... H01M 2/1061 429/81 |
| 2013/0108897 A1 | 5/2013 | Christian et al. |

OTHER PUBLICATIONS

Cord-H. Dustmann, "Advances in Zebra batteries," Journal of Power Sources 127 (2004) 85-92, www.sciencedirect.com.
"Heat for Every Drive Concept: Eberspaecher Supplies Efficient Systems for Electric and Hybrid Cars," Jan. 18, 2013, www.eberspaecher.com/nc/en/press/press-releases/individual-view/article-heat-for-every-drive-concept-eberspaecher-supplies-efficient-systems-for-electric-an . . . .

* cited by examiner

BATTERY THERMAL MANAGEMENT SYSTEM FOR ELECTRIFIED VEHICLE

CROSS REFERENCE TO RELATED APPLICATIONS

This is a continuation of U.S. patent application Ser. No. 14/155,657, which was filed on Jan. 15, 2014.

TECHNICAL FIELD

This disclosure relates to electrified vehicles, and more particularly, but not exclusively, to a battery thermal management system capable of maintaining battery cells of a battery system within a desired temperature range.

BACKGROUND

Hybrid electric vehicles (HEV's), plug-in hybrid electric vehicles (PHEV's), battery electric vehicles (BEV's), fuel cell vehicles and other known electrified vehicles differ from conventional motor vehicles in that they are powered by one or more electric machines (i.e., electric motors and/or generators) instead of or in addition to an internal combustion engine. High voltage current for powering these types of electric machine(s) is typically supplied by a traction battery system having one or more battery cells that store energy.

Battery systems are typically constructed of one or more battery modules that each includes a plurality of battery cells. In some conditions, heat is generated in the battery cells. This heat may need to be removed to improve battery cell capacity, life and performance. The battery cells may alternatively need heated in order to function properly in other conditions, such as extremely cold ambient conditions.

SUMMARY

A battery thermal management system according to an exemplary aspect of the present disclosure includes, among other things, a heat spreader, a coolant channel attached to the heat spreader and a supply manifold fluidly connected with the coolant channel and configured to supply a heat transfer medium to the coolant channel. A return manifold is fluidly connected with the coolant channel and configured to expel the heat transfer medium from the coolant channel.

In a further non-limiting embodiment of the foregoing system, the heat spreader is in contact with a battery cell.

In a further non-limiting embodiment of either of the foregoing systems, the system includes a plurality of battery cells and a plurality of heat spreaders, at least one of the plurality of heat spreaders interspersed between adjacent battery cells of the plurality of battery cells.

In a further non-limiting embodiment of any of the foregoing systems, the heat spreader is an annealed pyrolytic graphite plate or a flexible graphite sheet.

In a further non-limiting embodiment of any of the foregoing systems, a second coolant channel is attached to an opposite edge of the heat spreader from the coolant channel.

In a further non-limiting embodiment of any of the foregoing systems, a vacuum insulation panel is beneath the heat spreader.

In a further non-limiting embodiment of any of the foregoing systems, a film heater is on a first side of the vacuum insulation panel and a base is on a second side of the vacuum insulation panel.

In a further non-limiting embodiment of any of the foregoing systems, the heat transfer medium is a liquid coolant.

In a further non-limiting embodiment of any of the foregoing systems, the coolant channel includes at least one augmentation feature.

In a further non-limiting embodiment of any of the foregoing systems, a central supply line delivers the heat transfer medium to the supply manifold and a central return line communicates the heat transfer medium away from the coolant channel.

A battery system according to another exemplary aspect of the present disclosure includes, among other things, a battery module having at least one battery cell and a battery thermal management system configured to heat the at least one battery cell with a film heater in response to a first temperature condition and cool the at least one battery cell by transferring heat into a heat spreader in response to a second temperature condition.

In a further non-limiting embodiment of the foregoing system, the battery thermal management system includes the heat spreader adjacent to the at least one battery cell, a coolant channel attached to the heat spreader, a supply manifold near a first side of the coolant channel and a return manifold near a second side of the coolant channel.

In a further non-limiting embodiment of either of the foregoing systems, the battery thermal management system include a heat exchanger configured to cool a heat transfer medium communicated through the coolant channel.

In a further non-limiting embodiment of any of the foregoing systems, the battery thermal management system includes a base that supports the at least one battery cell.

In a further non-limiting embodiment of any of the foregoing systems, a vacuum insulation panel is mounted to the base.

In a further non-limiting embodiment of any of the foregoing systems, the film heater is positioned between the vacuum insulation panel and the at least one battery cell.

A method according to another exemplary aspect of the present disclosure includes, among other things, transferring heat from a battery cell to a heat spreader, conducting the heat from the heat spreader into a coolant channel and dissipating the heat into a heat transfer medium communicated inside the coolant channel to thermally manage the battery cell.

In a further non-limiting embodiment of the foregoing method, the method includes the step of sensing a temperature condition of the battery cell.

In a further non-limiting embodiment of either of the foregoing methods, the method includes the step of heating the battery cell in response to the temperature condition indicating a cold ambient condition.

In a further non-limiting embodiment of any of the foregoing methods, the method includes commanding the dissipating step in response to the temperature condition indicating a hot ambient condition.

A battery system according to another exemplary aspect of the present disclosure includes, among other things, a first battery module, a second battery module, a supply line, a return line, and a film heater. The supply and return lines are configured to circulate a heat transfer medium in response to a first temperature condition, and the film heat is configured to heat the first battery module and the second battery module in response to a second temperature condition.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a battery module for use in an electrified vehicle. The exemplary battery module includes a battery thermal management system capable of thermally managing one or more battery cells of the battery module. For example, the battery thermal management system described herein may be employed to heat and/or cool the battery cells in order to maintain the battery cells within a desired temperature range over a full range of ambient conditions. These and other features are described in this disclosure.

Figure 1:
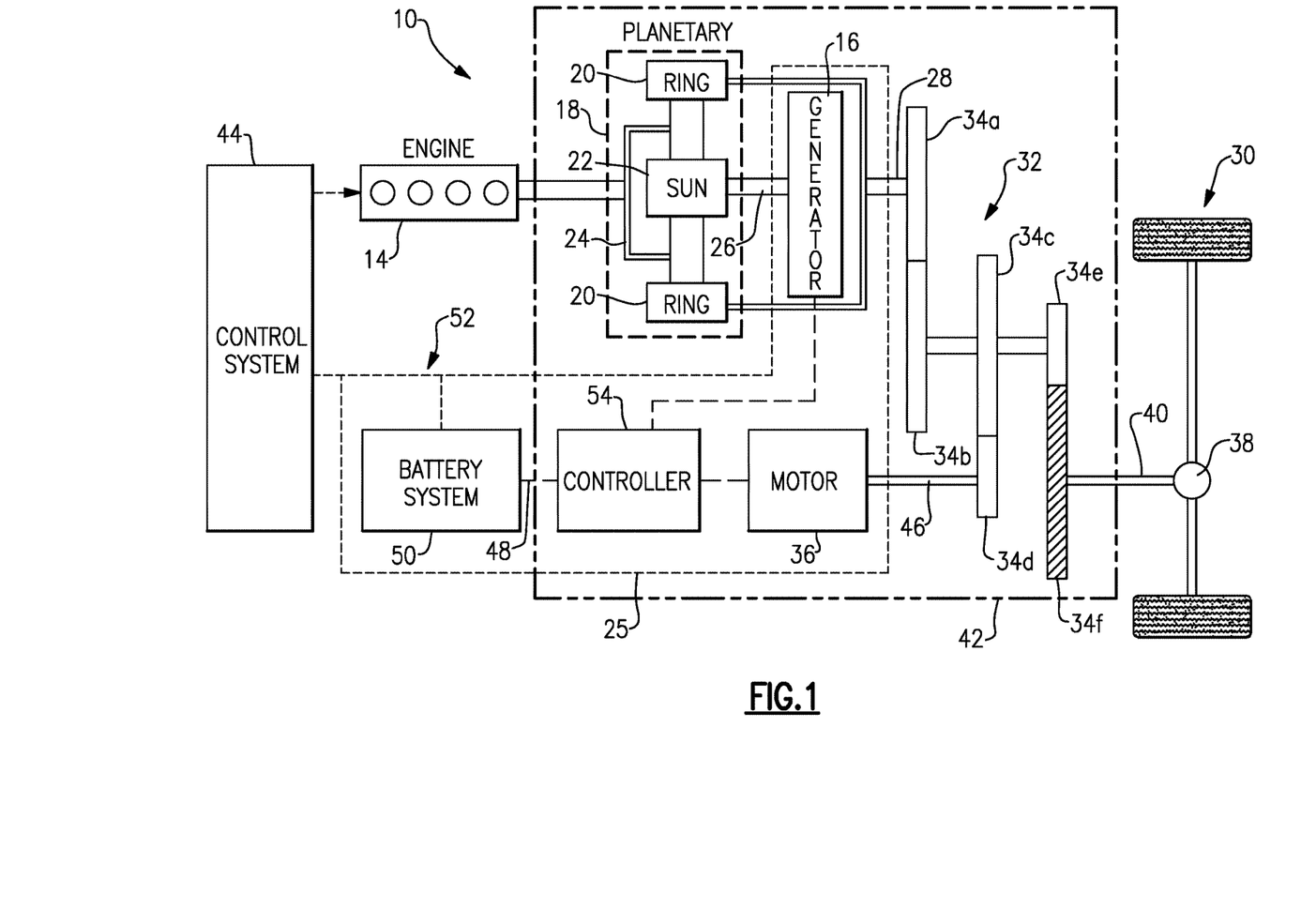
FIG. 1 schematically illustrates a powertrain of an electrified vehicle.

FIG. 1 schematically illustrates a powertrain 10 for an electrified vehicle 12, such as a HEV. Although depicted as a HEV, it should be understood that the concepts described herein are not limited to HEV's and could extend to other electrified vehicles, including but not limited to, PHEV's, BEV's, and fuel cell vehicles.

In one embodiment, the powertrain 10 is a powersplit system that employs a first drive system that includes a combination of an engine 14 and a generator 16 (i.e., a first electric machine) and a second drive system that includes at least a motor 36 (i.e., a second electric machine), the generator 16 and a traction battery system 50. For example, the motor 36, the generator 16 and the traction battery system 50 may make up an electric drive system 25 of the powertrain 10. The first and second drive systems generate torque to drive one or more sets of vehicle drive wheels 30 of the electrified vehicle 12, as discussed in greater detail below.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the traction battery system 50. The traction battery system 50 may be a high voltage battery that is capable of outputting electrical power to operate the motor 36 and the generator 16. Other types of energy storage devices and/or output devices can also be incorporated for use with the electrified vehicle 12. The traction battery system 50 may be made up of one or more battery modules that include battery cells that store the energy necessary to power the motor 36 and/or generator 16.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 may also communicate with a battery control module of the traction battery system 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

Figure 2:
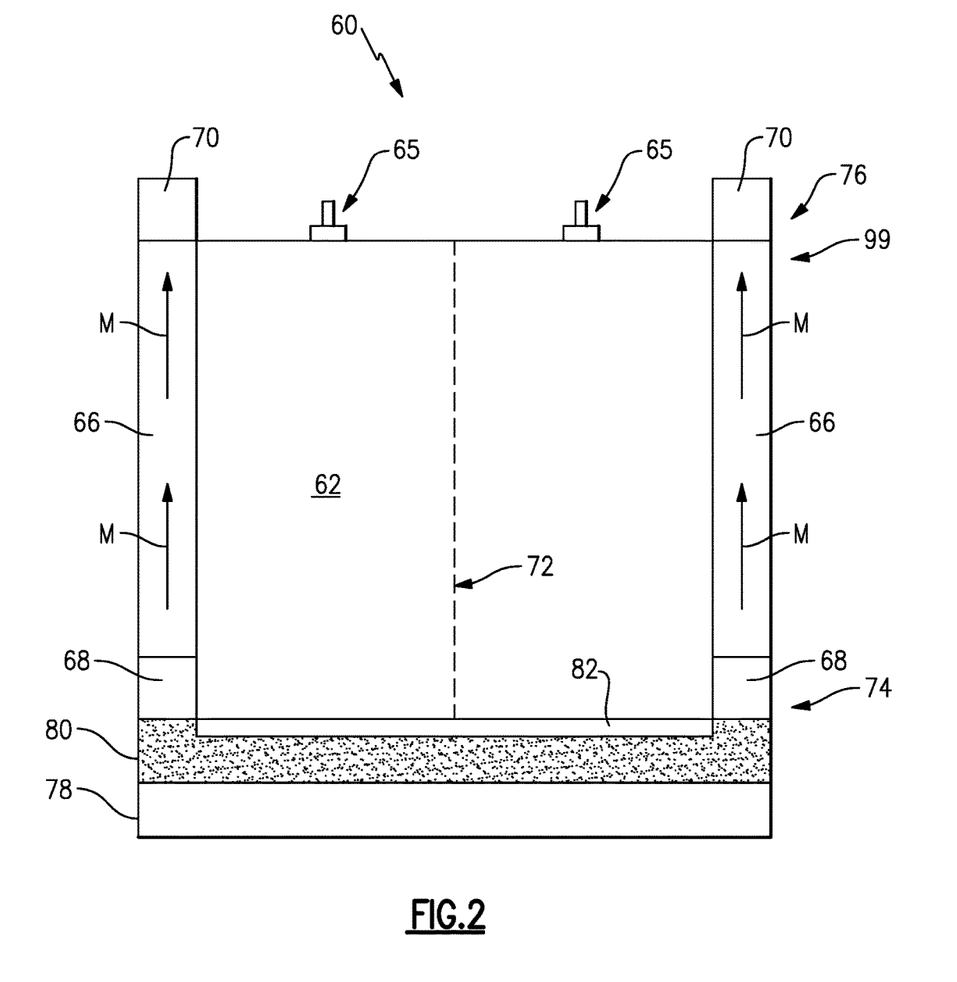
FIG. 2 illustrates a front view of a battery module of an electrified vehicle.
Figure 3:
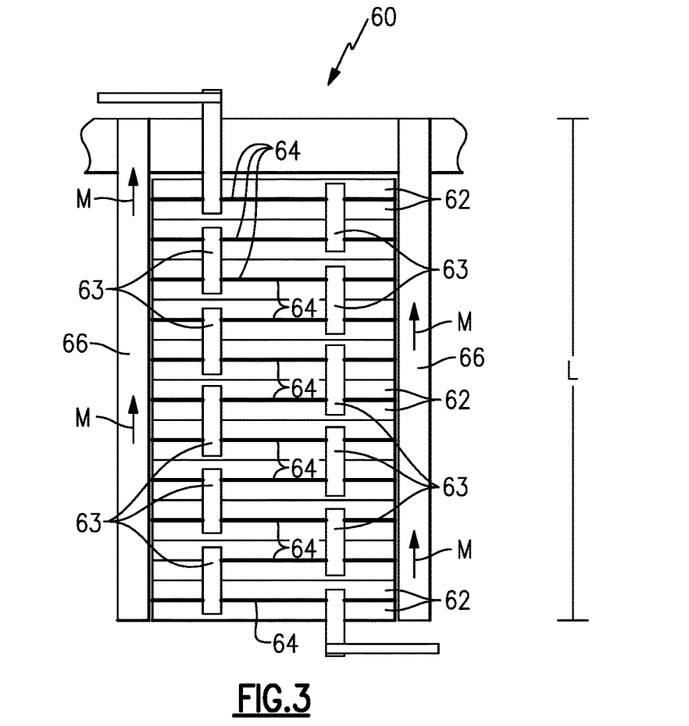
FIG. 3 illustrates a top view of the battery module of FIG. 2.

FIGS. 2 and 3 illustrate an exemplary battery module 60 that can be incorporated into an electrified vehicle. For example, the battery module 60 may be employed within the battery system 50 of the electrified vehicle 12 of FIG. 1. The battery system 50 could include any number of battery modules 60 for supplying electrical power to the electric machines 16, 36 of the electrified vehicle 12 (see FIG. 1). The number of battery modules 60 employed by the battery system 50 is not intended to limit this disclosure and could vary depending on the type of electrified vehicle 12.

One or more battery cells 62 may be stacked relative to one another to construct the battery module 60. The battery cells 62 may be stacked upright, on their sides, or in any other configuration. The battery cells 62 are prismatic, lithium-ion cells, in one non-limiting embodiment. Other battery cell types may also be utilized within the scope of this disclosure. Each battery cell 62 includes two terminals 65 that project outwardly from the battery cell 62. Cell interconnects 63 (see FIG. 3) may be utilized to electrically connect adjacent battery cells 62 in parallel. The cell interconnects 63 may extend in a single plane above the battery cells 62. In one embodiment, the parallel pairs of battery cell 62 may be connected in series with other battery cell 62 pairs.

Heat may be generated by each battery cell 62 during charging and discharging operations. Heat may also be transferred into the battery cells 62 during key-off conditions of the electrified vehicle 12 as a result of relatively extreme (i.e., hot) ambient conditions. The battery module 60 may therefore include a battery thermal management system 99 for thermally managing the battery cell 62 over a full range of ambient conditions.

In one embodiment, the battery thermal management system 99 includes one or more heat spreaders 64 (see FIG. 3) and coolant channels 66, a supply manifold 68 and a return manifold 70. As discussed in greater detail below, waste heat may be transferred from the battery cells 62 to the edges of the heat spreaders 64 and subsequently dissipated via a heat transfer medium M communicated through the coolant channels 66.

The heat spreaders 64 provide heat transfer across a wrap axis 72 (see FIG. 2) of the battery cells 62. In one embodiment, one heat spreader 64 is sandwiched between two adjacent battery cells 62. The heat spreaders 64 can be fixedly attached to the battery cells 62 in any known manner. In one embodiment, the battery module 60 includes a plurality of battery cells 62 and a plurality of heat spreaders 64, with at least one heat spreader 64 interspersed between adjacent battery cells 62.

The heat spreaders 64 could embody any size or shape. The total number, size and shape of the battery cells 62 and the heat spreaders 64 are not intended to limit this disclosure.

In one embodiment, the heat spreaders 64 are aluminum or copper sheets. In another non-limiting embodiment, the heat spreaders 64 are aluminum encapsulated annealed pyrolytic graphite plates. In another embodiment, the heat spreaders 64 are flexible graphite sheets. In yet another embodiment, the heat spreaders 64 are aluminum or steel. For example, an aluminum or steel battery casing may serve as a heat spreader. The heat spreaders 64 have a relatively high thermal conductivity in order to conduct heat out of the battery cells 62. Other thermally conductive materials (e.g., heat pipes) may also be suitable for the heat spreaders 64.

One coolant channel 66 may be attached to each side of the heat spreader 64. The coolant channels 66 may be connected to the heat spreader 64 in any known manner, including but not limited to, soldering, brazing, or by using thermal grease. If the battery cells 62 incorporate electrically active metal cases, the heat spreaders 64 may be electrically isolated from the battery cells 62 using, for example, thin plastic coatings. The coolant channels 66 may also extend across an entire length L of the battery module 60 (see top view of FIG. 3). In other words, the coolant channels 66 define a single conduit along each side of the battery module 60.

A heat transfer medium M may be communicated through the coolant channels 66 in order to remove heat that has been conducted out of the battery cells 62 through the heat spreaders 64. The heat transfer medium M may be a liquid coolant. In one non-limiting embodiment, the heat transfer medium M includes 60% ethylene glycol and 40% water. However, other heat transfer mediums or coolants may be suitable for this application.

Figure 4:
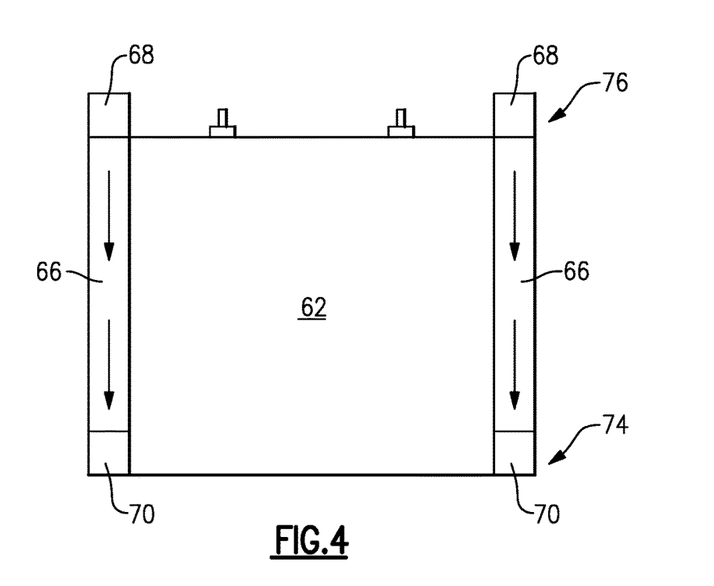
FIG. 4 illustrates another battery module.

The heat transfer medium M is transferred to the supply manifold 68. The supply manifold 68 communicates the heat transfer medium M to the coolant channel 66 prior to exiting through the return manifold 70. In one embodiment, the supply manifold 68 is near a bottom 74 of the coolant channel 66 and the return manifold 70 is near a top 76 that is opposite from the bottom 74. In the illustrated embodiment, the heat transfer medium M travels vertically from the bottom 74 toward the top 76 of the coolant channel 66 (see FIG. 2). However, an opposite configuration is also contemplated in which the heat transfer medium M flows downwardly within the cooling channel 66 from the top 76 toward the bottom 74 (see FIG. 4). In another embodiment, the return manifold 70 extends in a plane that is above the plane of the cell interconnects 63.

The battery cells 62 as well as the various other components of the battery module 60 are supported by a base 78. The base 78 is a support structure that transfer loads experienced by the battery module 60 into a battery support frame (not shown).

A vacuum insulation panel (VIP) 80 may be mounted to the base 78. The VIP 80 insulates the base 78 and protects the battery cells 62 from ambient temperatures. The VIP 80 may include a relatively low thermal conductivity for thermally isolating the battery cells 62 from variations in ambient conditions.

A film heater 82 may be positioned to extend between the battery cells 62 and the VIP 80. In other words, the film heater 82 may be located at the bottom of the battery cells 62. The film heater 82 is selectively actuated ON to heat the battery cells 62, such as during extremely cold ambient conditions. In one embodiment, the film heater 82 is a positive-temperature-coefficient (PTC) film heater, although other heating devices are also contemplated.

Figure 5:
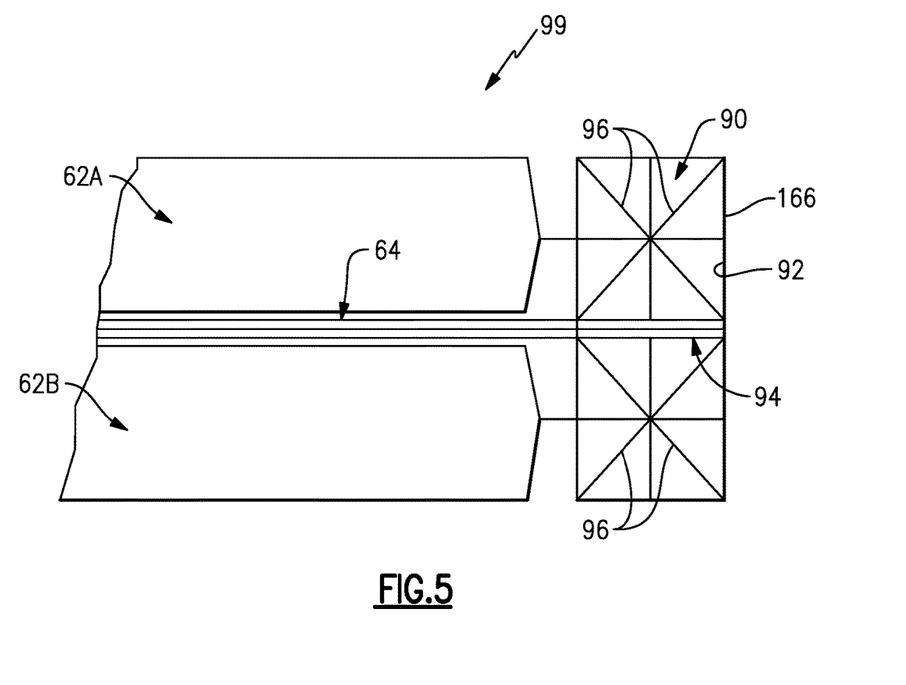
FIG. 5 illustrates a cooling channel of a battery thermal management system.

FIG. 5 illustrates a coolant channel 166 of a battery thermal management system 99. In this disclosure, like reference numbers designate like elements where appropriate and reference numerals with the addition of 100 or multiples thereof designate modified elements that are understood to incorporate the same features and benefits of the corresponding original elements A heat spreader 64 extends between a first battery cell 62A and a second battery cell 62B. The coolant channel 166 is connected to an edge 94 of the heat spreader 64.

In one embodiment, the coolant channel 166 includes at least one augmentation feature 90. The augmentation features 90 increase the heat transfer effect between the heat transfer medium M (see FIG. 2) and the cooling channel 166. The augmentation features 90 are formed on or extend from an inner wall 92 of the coolant channel 166. The augmentation features 90 could include a plurality of fins 96 that diagonally extend across the coolant channel 166. However, other augmentation features having different configurations could be incorporated into the design, including but not limited to fins, turbulators, dimples or other features.

Figure 6:
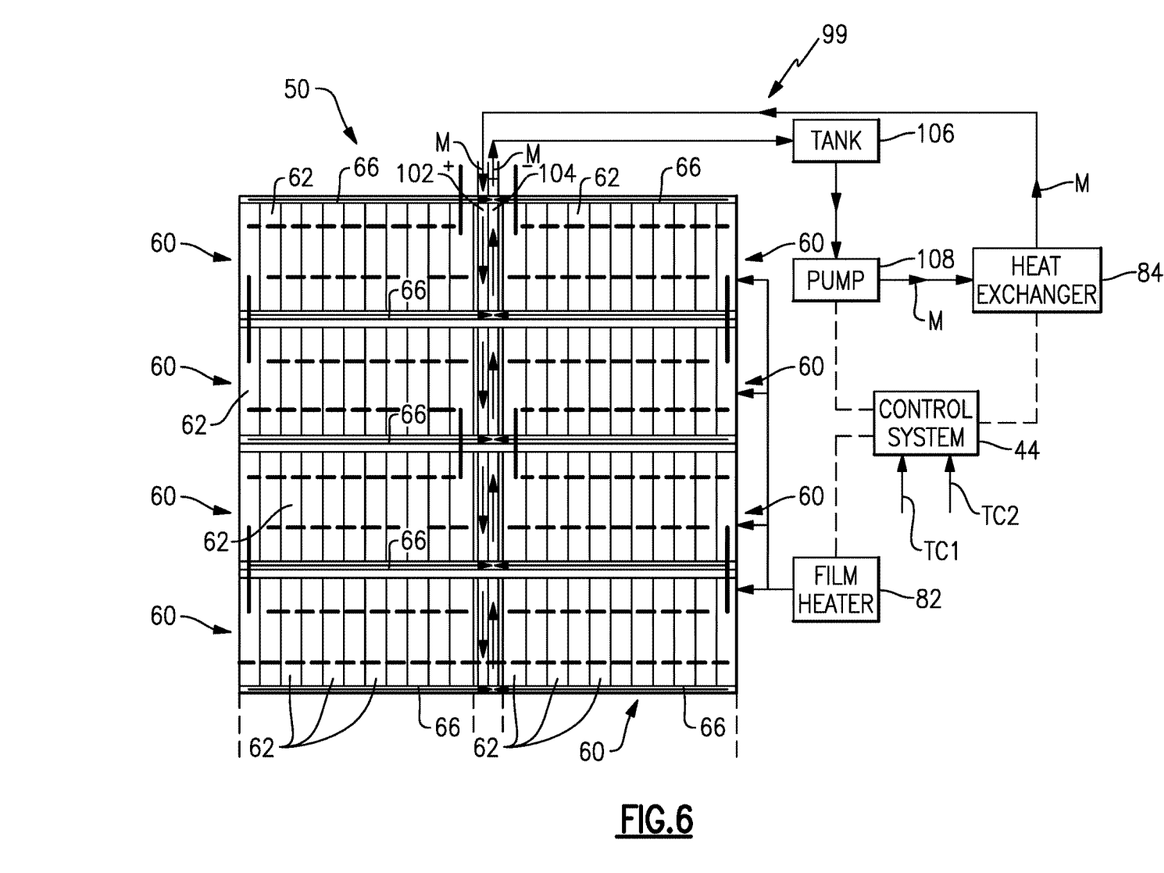
FIG. 6 illustrates a battery thermal management system for thermally managing a battery system.

FIG. 6 schematically illustrates operation of the battery thermal management system 99 as part of a closed loop system in order to thermally manage the battery cells 62 of multiple battery modules 60 of a battery system 50. The battery thermal management system 99 may include a central supply line 102 and a central return line 104. The central supply line 102 and the central return line 104 may extend at any location relative to the battery modules 60 of the battery system 50. In one non-limiting embodiment, the central supply line 102 and the central return line 104 extend along a center of the battery system 50 between horizontally adjacent battery modules 60.

The central coolant supply line 102 delivers the heat transfer medium M to the supply manifolds 68 (see FIGS. 2-3), which supply the coolant channels 66. The central coolant return line 104 is in fluid communication with the return manifolds 70 (see FIGS. 2-3) for expelling the heat transfer medium M from the battery system 50 after removing heat from the battery cells 62 of each battery module 60.

The heat transfer medium M may be stored within a tank 106. A pump 108 circulates the heat transfer medium M through the closed loop battery thermal management system 99.

A heat exchanger 84 may be positioned downstream from the central return line 104. The heat transfer medium M can therefore be communicated to the heater exchanger 84 after it has been communicated through the coolant channels 66 to remove heat from the battery cells 62. After being cooled by the heat exchanger 84 (for example, using a separate refrigeration unit, not shown), the heat transfer medium M may be returned to the central supply line 102 to recirculate the heat transfer medium M for removing additional heat from the battery cells 62.

In one non-limiting use, the battery thermal management system 99 can heat the battery cells 62 in response to a first temperature condition TC1 (i.e., relatively cold ambient temperatures) and cool the battery cells 62 in response to a second temperature condition TC2 (i.e., relatively hot ambient temperatures). The first and second temperature conditions TC1 and TC2 can be sensed by the control system 44 (see also FIG. 1), which may be in communication with the thermal management system 99. The control system 44 may actuate the film heater 82 (shown schematically in FIG. 6) ON in response to sensing the first temperature condition TC1. The film heater 82 heats the battery cells 62 when actuated ON. The battery cells 62 may need heated during non-operation of the electrified vehicle, such as during the winter months of colder climates. The heat transfer medium M may not be circulated through the battery thermal management system 99 in response to the first temperature condition TC1.

The film heater 82 is commanded OFF in response to sensing the second temperature condition TC2. The heat exchanger 84 may be used to cool the heat transfer medium M in response to sensing the second temperature condition TC2. The cooled heat transfer medium M may then be returned to the central supply line 102 for cooling the battery cells 62. Heat from the battery cells 62 is dissipated into the heat transfer medium M as it is communicated inside the coolant channels 66. The battery cells 62 may need cooled during relatively hot ambient temperatures, such as during summer months or in warmer climates.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery system, comprising:
a first battery module;
a second battery module;
a supply line and a return line each located axially between said first battery module and said second battery module and configured to circulate a heat transfer medium in response to a first temperature condition; and
a film heater configured to heat said first battery module and said second battery module in response to a second temperature condition.

2. The system as recited in claim 1, wherein said first battery module and said second battery module are horizontally adjacent, and said supply line and said return line extend along a center of said battery system axially between first battery module and said second battery module.

3. The system as recited in claim 1, wherein each of said first battery module and said second battery module includes:
a supply manifold in communication with said supply line; and
a return manifold in communication with said return line.

4. The system as recited in claim 1, comprising a heat exchanger positioned downstream from said return line.

5. The system as recited in claim 1, comprising control system configured to sense said first temperature condition and said second temperature condition.

6. The system as recited in claim 5, wherein said control system is configured to command said film heater ON in response to sensing said second temperature condition.

7. The system as recited in claim 1, wherein each of said first battery module and said second battery module include a plurality of battery cells.

8. The system as recited in claim 7, wherein said heat transfer medium removes heat from said plurality of battery cells as it is communicated within said supply line.

9. The system as recited in claim 1, wherein said heat transfer medium is stored within a tank, and a pump circulates said heat transfer medium in a closed loop of said battery system.

10. The system as recited in claim 1, wherein each of said first battery module and said second battery module include:
a battery cell;
a heat spreader in contact with said battery cell;
a coolant channel attached to said heat spreader.

11. The system as recited in claim 10, comprising a supply manifold connected to said coolant channel and in communication with said supply line.

12. The system as recited in claim 10, comprising a return manifold connected to said coolant channel and in communication with said return line.

13. The system as recited in claim 1, wherein each of said first battery module and said second battery module include a vacuum insulation panel, and said film heater is located between said first battery module and said second battery module and said vacuum insulation panel.

14. The system as recited in claim 1, wherein said film heater is in direct contact with a bottom surface of a battery cell of at least one of said first battery module and said second battery module.

15. The system as recited in claim 1, wherein said film heater is a positive temperature coefficient film heater.

16. A battery system, comprising:
a first battery module;
a second battery module horizontally adjacent to said first battery module such than a first end of said first battery module faces a second end of said second battery module;
a supply line and a return line each located axially between said first end of said first battery module and said second end of said second battery module and configured to circulate a heat transfer medium in response to a first temperature condition; and
a film heater configured to heat said first battery module and said second battery module in response to a second temperature condition, wherein said film heater is in direct contact with a bottom surface of a battery cell of at least one of said first battery module and said second battery module.

* * * * *

UNITED STATES PATENT AND TRADEMARK OFFICE
CERTIFICATE OF CORRECTION

PATENT NO. : 9,799,932 B2  
APPLICATION NO. : 15/362845  
DATED : October 24, 2017  
INVENTOR(S) : Harold J. Haskins et al.

It is certified that error appears in the above-identified patent and that said Letters Patent is hereby corrected as shown below:

In the Claims

In Claim 5, Column 8, Line 59; after "comprising" insert --a--

In Claim 16, Column 10, Line 10; after "battery module such" replace "than" with --that--

Signed and Sealed this  
Fifteenth Day of May, 2018

Andrei Iancu  
*Director of the United States Patent and Trademark Office*